United States Patent [19]

McClain

[11] 4,265,799

[45] May 5, 1981

[54] ALCOHOL-WET PARTICLES OF ETHYLENE-VINYL ESTER INTERPOLYMER

[75] Inventor: Dorothee M. McClain, Cincinnati, Ohio

[73] Assignee: National Distillers and Chemical Corp., New York, N.Y.

[21] Appl. No.: 78,530

[22] Filed: Sep. 24, 1979

Related U.S. Application Data

[62] Division of Ser. No. 934,647, Aug. 17, 1978, Pat. No. 4,217,423.

[51] Int. Cl.³ .............................................. C08K 5/05
[52] U.S. Cl. ................................. 260/33.4 R; 525/57; 525/62
[58] Field of Search ...................... 260/33.4 R; 525/57

[56] References Cited

U.S. PATENT DOCUMENTS

| 3,510,463 | 5/1970 | Bristol | 525/62 |
|---|---|---|---|
| 3,622,555 | 11/1971 | Rothenbury et al. | 528/496 |
| 3,780,004 | 12/1973 | Hoyt et al. | 525/62 |

*Primary Examiner*—Stanford M. Levin
*Attorney, Agent, or Firm*—Kenneth D. Tremain

[57] ABSTRACT

Particles of ethylene-vinyl ester interpolymer containing at least about 30% by weight of copolymerized vinyl ester which are produced in aqueous dispersion media when recovered from such media exhibit a tendency to coalesce into unmanageable agglomerates which is prevented herein by adding an anti-coalescing amount of a lower saturated aliphatic monohydroxyl alcohol such as ethanol or isopropanol to the dispersion media and recovering the interpolymer particles therein in the alcohol-wet condition.

4 Claims, No Drawings

4,265,799

ALCOHOL-WET PARTICLES OF ETHYLENE-VINYL ESTER INTERPOLYMER

This is a division, of application Ser. No. 934,647, filed Aug. 17, 1978, U.S. Pat. No. 4,317,423.

BACKGROUND OF THE INVENTION

1. Field of the Invention

This invention relates to the fields of ethylene vinyl ester interpolymers in particulate form and to processess for alcoholyzing such interpolymers to provide vinyl alcohol-containing interpolymers.

2. Description of the Prior Art

Ethylene-vinyl ester interpolymer powders have a wide variety of applications such as flexibilizers and impact modifiers for other resins, notably, the polyvinyl chlorides, as substrate polymers for graft copolymerization with other monomers and as starting materials for the manufacture of ethylene-vinyl ester-vinyl alcohol terpolymers and ethylene-vinyl alcohol copolymers, especially by alcoholysis. Frequently, an ethylene-vinyl ester interpolymer powder is obtained by the known technique of melt dispersion, i.e., by adding the interpolymer to water maintained at a temperature above the melting point of the resin, adding a suitable surfactant or emulsifier to the molten resin mixture as a dispersing agent, mechanically stirring the mixture to obtain an acceptable dispersion of interpolymer, cooling the aqueous dispersion to at least the solidification point of the molten dispersed interpolymer particles, filtering the solidified particles from the aqueous dispersion medium, and washing and drying the resin particles.

It is known from U.S. Pat. Nos. 3,780,004 to Hoyt et al. and 3,510,463 to Bristol, and British Pat. No. 1,095,204, that particulate ethylene-vinyl ester inter-polymers of relatively low vinyl ester content can be subjected to solid state alcoholysis. However, it has been observed that with finely divided ethylene-vinyl ester interpolymers containing about 30% or more vinyl ester content by weight, rapid filtration is virtually impossible and the particles comprising the resulting filter cake will, upon drying, agglomerate thereby excluding the use of the resin as a practical source material for the above-noted applications of ethylene-vinyl ester copolymers. Were it not for the tendency of ethylene-vinyl ester interpolymer particles to coalesce, a tendency which becomes more pronounced with increasing vinyl ester content and diminishing particle size the direct use of the high surface area particulate filter cake for conversion to particulate vinyl alcohol-containing polymers by solid phase alcoholysis employing caustic alcohol would be economically and technically compelling.

There is consequently a need for an effective procedure for rapidly filtering finely divided ethylenevinyl ester interpolymer particles containing 30% or more vinyl ester content by weight from aqueous dispersion media to provide a filter cake suitable for applications requiring a substantially aggregate-free powder.

SUMMARY OF THE INVENTION

It has surprisingly been discovered that if an anti-coalescing amount of a lower saturated aliphatic monohydroxyl alcohol such as ethanol or isopropanol is added to aqueous dispersion media of finely divided ethylene-vinyl ester interpolymer particles containing at least about 30% by weight of vinyl ester accompanied by, or followed with, agitation prior to recovery of the interpolymer particles therefrom, recovery, e.g., by filtration, can be rapidly and conveniently carried out. Moreover, no appreciable coalescence of the interpolymer particles comprising the filter cake can take place provided the filter cake is maintained in the alcohol-wet condition. In this state, the ethylene-vinyl ester interpolymer filter cake, i.e., the solid component of a filtered slurry of an aqueous dispersion with added alcohol, is well suited for direct conversion to vinyl alcohol-containing polymers by solid phase alcoholysis. Generally speaking, the physical effect of hydrolysis on ethylene-vinyl ester interpolymer powders is to increase their hardness and to suppress or eliminate their tendency to coalesce into clumps even when the powders are in the dry state. The term "alcohol-wet" shall be understood herein to refer to that condition of the ethylene-vinyl ester interpolymer particles retained on the filter membrane in which substantially all of the particles are surrounded or coated with a film of dilute or concentrated anti-coalescing alcohol. The term "finely divided" as it applies to the ethylene-vinyl ester interpolymers herein contemplates an average particle size ranging from about 20 up to about 500 microns with from about 80% to about 90% of the particles being less than about 250 microns. With the preferred interpolymers, a substantial majority of the particles are less than about 150 microns, usually ranging from about 20 to about 150 microns, with most of the particles being in the range of from about 50 to about 100 microns. Ethylene-vinyl ester interpolymers having an average particle size less than about 50 microns are most preferred, especially when the interpolymers are to serve as starting materials for conversion to ethylene-vinyl estervinyl alcohol terpolymers by solid phase alcoholysis as hereinafter described. The term "rapid filtration" and terms of like import as used herein refer to the relative speeds with which filtration can be accomplished in accordance with the process of this invention for specific ethylene-vinyl acetate interpolymer dispersions compared to the speeds of filtration for the identical dispersions to which an anti-coalescing alcohol has not been added. The improvement in filtration speed will vary with the particle size distribution of the dispersed resin. In the smaller average particle size ranges, the benefits conferred by the process of this can be quite dramatic, with increases in filtration rate on the order of a factor of five or ten times being typically achieved. Thus for example an untreated dispersed resin which requires more than 45 minutes for the completion of filtration (and exhibits coalescence at that) has required only 5 minutes for the completion of filtration when treated with ethanol in accordance with this invention.

DESCRIPTION OF THE PREFERRED EMBODIMENTS

The lower saturated aliphatic monohydroxyl alcohols which are useful herein to accomplish the rapid filtration of ethylene-vinyl ester powders from their aqueous dispersions can be selected from among any of the monohydroxyl alkanols which are miscible with water at the levels used, e.g., alkanols having from one to three carbon atoms such as methanol, ethanol, n-propanol and isopropanol. When the use of methanol as an anti-coalescing agent to improve filtration speed provides acceptable results, it is preferred to employ a higher alcohol when the filter cake is to be used for solid-phase alcoholysis since it has been found that the rate of alcoholysis is significantly higher with alcohols of increasing chain length. The primary alcohols are preferred for use herein and of these, ethanol, n-propanol, n-butanol and isobutanol are especially preferred, although excellent results are obtained with the secondary alcohol, isopropanol. The quantities of anti-coalescing alcohol employed will, of course, vary according to the tendency of the ethylene-vinyl ester interpolymer powder to resist rapid filtration and form agglomerates, which as stated above, is a function of the vinyl ester content and particle size distribution of the interpolymer. Other factors influencing the level of use of the anti-coalescing alcohol include the concentration of the interpolymer powder in the dispersion media, the nature and amount of the dispersing agent(s) and the presence of diluents, e.g, water, in the anti-coalescing alcohol. Simple and routine experimentation can readily establish the optimum quantity of anti-coalescing alcohol required for a particular filtration operation. For many ethylene-vinyl ester interpolymer powder dispersions, from about 0.2 parts to about 30 parts alcohol per part of dispersion by weight will provide entirely acceptable results with from about 0.5 parts to about 2.0 parts alcohol being preferred. It is also preferred that the anti-coalescing alcohol be provided in the most concentrated form commercially available. The alcohol-wet filter cake can, if desired, be washed with additional portions of anti-coalescing alcohol in order to remove any vestiges of dispersing agent and/or water accompanying the freshly filtered resin. The alcohol-containing filtrate, following purification and reconcentration of the alcohol by known and/or conventional means, is advantageously recycled to recover a further amount of ethylene-vinyl ester interpolymer powder from aqueous dispersions of the same.

The ethylene-vinyl ester interpolymers which are susceptible to treatment with an anti-coalescing alcohol in accordance with this invention are normally solid at room temperature. Preferably, such interpolymers comprise copolymers of ethylene and a vinyl ester such as vinyl formate, vinyl acetate, vinyl trimethylacetate, vinyl propionate, vinyl butyrate, vinyl trifluoroacetate, and the like. The interpolymers contain at least about 30% vinyl ester by weight and can contain up to about 95% vinyl ester by weight. Partially hydrolyzed ethylene-vinyl ester co-polymers are also suitable for use herein provided they contain at least about 30% unhydrolyzed vinyl ester groups by weight. Minor amounts of one or more other monomers copolymerizable with ethylene, i.e., amounts of up to 10% by weight of total comonomers, can be contained in the interpolymer as, for example, another vinyl ester, carbon monoxide, methyl acrylate, n-butyl acrylate, di-n-butyl maleate, diethyl itaconate, acrylic acid, methacrylic acid, fumaric acid, and so forth. While the invention herein is described and illustrated in connection with the rapid filtration of ethylenevinyl acetate interpolymers, it is understood that the advantages of this invention are also conferred upon the rapid filtration of other ethylene-vinyl ester copolymers which are present in aqueous dispersion media, especially copolymers made therein by emulsion or dispersion copolymerization of ethylene and vinyl acetate.

The advantages of this invention are particularly realized when the filtered ethylene-vinyl ester interpolymer particles are to be employed as source materials for conversion by solid phase alcoholysis into vinyl alcohol-containing interpolymers. The very high surface area presented by the non-coalesced alcohol-wet ethylene-vinyl ester interpolymer filter cakes of this invention results in efficient and rapid alcoholysis of the interpolymers and provides free flowing hydrolyzed powders even after drying. Moreover, the alcohol-wet resin particles constituting the filter cakes herein remain swollen throughout the alcoholysis reaction, a factor which has been observed to facilitate contact of the alcoholysis catalyst with the resin, and therefore the rate with which a predetermined level of alcoholysis can be obtained. When the resin dispersions of this invention are prepared by a melt dispersion technique employing a surfactant or emulsifier to achieve dispersion of the resin in an aqueous medium (see, for example, U.S. Pat. Nos. 3,418,265; 3,422,049; and 3,522,036, each of which is incorporated by reference herein), it is generally advantageous to recover the resin particles admixed with a residual amount of the surfactant as the presence of the latter appears to further enhance contact of the alcoholysis catalyst with the resin. Accordingly, it is further within the scope of the present invention to directly alcoholyze the alcohol-wet ethylene-vinyl ester interpolymer filter cake obtained in accordance with this invention to provide non-blocking ethylene-vinyl ester-vinyl alcohol terpolymers and ethylene-vinyl alcohol copolymers. Advantageously, the particles comprising the alcohol-wet ethylene-vinyl ester interpolymer filter cake will have diameters averaging less than 500 microns. In general, the particle size of the alcohol-wet ethylene-vinyl acetate copolymer does not suffer substantial change during the alcoholysis process, that is, the particle size of the alcoholyzed product is set in the dispersion process. The alcohol selected for accomplishing the alcoholysis reaction herein is selected from the same group of alcohols recited above as suitable anti-coalescing agents. For simplicity of operation it is generally preferred to alcoholyze the alcohol-wet ethylene-vinyl ester interpolymer filter cake with a lower saturated aliphatic monohydroxyl alcohol which is the same as the anti-coalescing alcohol added to the aqueous dispersion of interpolymer to improve the rate of filtration of the latter. In order to maintain the freshly filtered interpolymer in the wet condition, it may be necessary from time to time to add additional quantities of alcohol, or, preferably to keep the alcohol-wet particles in closed container, where they will retain their identity for prolonged periods.

As recognized in the art, any of a variety of alkaline materials can be utilized as catalysts for the alcoholysis reaction. The preferred catalyst is an alkali metal or alkaline earth metal alkoxide of the alcoholyzing alcohol added to the filter cake, e.g, sodium ethoxide, potassium isopropoxide, potassium-t-butoxide, magnesium ethoxide, and the like. These catalysts can be added as such or can be prepared in situ by the reaction of the alcoholyzing alcohol with the appropriate alkali or alkaline earth metal. Additionally, compounds such as lithium hydroxide, sodium hydroxide, potassium hydroxide, magnesium hydroxide and calcium hydroxide may be used as catalysts.

Although widely varying proportions of ethylene-vinyl ester interpolymer particles and alcoholyzing alcohol can be employed herein, it is generally preferred to employ only as much of the alcohol as is necessary to achieve the desired level of alcoholysis within a reasonable reaction time. Ratios of 1.5:1 to 3:1 alcohol to dry polymer by weight are entirely suitable and provide good results. It is recognized that residual anti-coalescing alcohol present in the interpolymer filter cake will constitute a part, and possibly even all, of the requisite alcoholyzing alcohol for a particular alcoholysis operation, it being necessary in the latter case to only add catalyst.

The alcoholyzing alcohol, in the presence of the basic catalyst, effects alcoholysis of the vinyl ester repeating units in the interpolymer, reacting with the same to form vinyl alcohol repeating units in the interpolymer and the by-product acetic ester of the alcoholyzing alcohol. The alcoholyzing alcohol is present in the reaction medium in an amount at least stoichiometrically equivalent to the number of moles of the vinyl ester repeating units to be alcoholyzed. Alcoholysis temperatures of from about 0° C. to about 150° C., and preferably from about 30° C. to about 100° C., can be employed. The alcoholysis reaction can be conducted at ambient pressure or at superatmospheric pressures of up to about 5,000 p.s.i. Reaction times can be broadly varied; thus, the alcoholysis can be carried out for periods of from about 1 second to 2 hours and preferably, from about 15 seconds to 15 minutes.

The alcohol-wet ethylene vinyl ester interpolymer particulate mass is combined with the alcoholysis medium with the temperature, pressure and reaction times regulated as aforesaid. The medium is desirably maintained substantially free of water and the reaction is carried out under a dry, preferably inert, atmosphere. Accordingly, washing of the ethylene-vinyl ester interpolymer particles with a highly concentrated or anhydrous alcohol prior to carrying out the alcoholysis reaction is desirable as this preliminary step will have the effect of removing most if not all of the residual water associated with the freshly filtered resin. Although it is preferred to employ the same alcohol for the washing procedure which was employed in the filtration procedure and which will be employed for the hydrolysis reaction, such alcohol can be different from the alcohol(s) used in the latter operations.

The following examples are illustrative of rapid filtration processes employing a coagulating alcohol in accordance with this invention.

EXAMPLE 1

Filtration of a 30 ml aqueous dispersion (33.46% solids content by weight) of ethylene-vinyl acetate interpolymer particles containing about 40% vinyl acetate by weight was attempted. Filtration proceeded very slowly and could not be completed due to blinding and packing of the filter. To the same dispersion were added 30 ml of methanol to prevent coalescence of the interpolymer particles. An additional 15 ml of methanol were added to the dispersion under agitation in a Waring Blender. The dispersion was then filtered, washed with methanol and kept in the methanol-wet state. Filtration was fairly rapidly accomplished although some minor agglomeration of resin particles was noted.

EXAMPLES 2-3

In place of the addition of methanol in Example 1, ethanol in an identical filtration procedure, and isopropanol in another identical filtration procedure, were employed. Both anti-coalescing alcohols provided good rates of filtration and still smaller quantities of particle agglomerates which were entirely acceptable for such uses of the particles as previously disclosed herein. A blend of 30% PVC powder with the foregoing alcohol-wet filter cakes provides a free-flowing powder following drying. Both alcohol-wet filter cakes were ideally suited for hydrolysis employing 10% by weight solutions of KOH/ethanol.

EXAMPLE 4

To 342 g of a 47.65% solids dispersion of a vinyl acetate-ethylene copolymer containing about 40% vinyl acetate by weight was added 544 ml ethanol (429.4 g) and filtration was carried out using Whatman filter paper No. 541. Filtration was complete within 5 minutes and the ethanol-wet filter cake contained 78.1% solids by weight.

To 299.3 g of the same resin dispersion were added 426 g water and filtration was carried out, again, with Whatman filter paper No. 541. Filtration required 46 minutes for completion and coalescence of resin particles was observed.

EXAMPLE 5

25 grams of the methanol-wet filter cake prepared in accordance with Examples 1-3 containing approximately 48% solids, was charged to a small Waring Blender with 55.1 grams of 5.7% methanolic potassium hydroxide and reacted with agitation for 5 minutes at a temperature ranging from 24° to 54° C. whereupon the reaction was terminated with water and acetic acid. The release of characteristic ester odor was noticed during the reaction, and the recovered polymer powder evidenced a residual vinyl acetate level of 35.8 percent by weight.

EXAMPLE 6

264 g of an ethanol-wet ethylene-vinyl acetate resin (about 33% vinyl acetate content by weight) filter cake (67.19% solids by weight) containing 0.64% water and 0.13% residual surfactant (Pluronic F98 of BASF Wyandotte Ind. Chem. Group, a nonionic surfactant of ethylene oxide with a hydrophobic base formed by condensing propylene oxide with propylene glycol and having a hydrophilic-lipophilic balance of 27.5) was alcoholyzed by the addition to the filter cake of 350 ml (314.65 g) of 11% KOH (actual) in ethanol (0.0215% water by weight in ethanol). The filter cake was stirred in a flask placed in a water bath heated to 55°-60° C. The temperature of the contents of the flask increased from 55° to 67° C. over a period of 15 minutes indicating the progress of the alcoholysis reaction. After 30 minutes total alcoholysis reaction time, the vinyl acetate content was reduced to 2.14%. No significant change in particle size distribution of the hydrolyzed resin compared to the resin prior to hydrolysis took place as shown below:

| Particle Diameter (microns) | Particle Size Distribution Weight, Percent | |
|---|---|---|
| | Before Alcoholysis | After Alcoholysis |
| <74 | 49.0 | 51.4 |
| 74-106 | 7.5 | 7.1 |
| 106-149 | 12.4 | 9.0 |
| 149-250 | 23.4 | 25.1 |
| 250-420 | 7.2 | 7.1 |
| 420 | 0.4 | 0.4 |

EXAMPLE 7

25 grams of the ethanol wet filter cake of Example 2, containing approximately 48% solids, was charged to a Waring Blender with 55 grams of 5.7% ethanolic potassium hydroxide and reacted with agitation for 5 minutes at a temperature ranging from 24° to 53° C., whereupon the reaction was terminated with water and acetic acid. The recovered polymer powder evidenced a residual vinyl acetate level of 25.9% by weight.

In another run, the reaction was allowed to proceed for fifteen minutes, whereupon residual vinyl acetate of the recovered polymer was 7.7% by weight.

In a similar manner, 57 grams of 10% ethanol potassium hydroxide was used in the solid state alcoholysis to a final temperature of 57° C. at five minutes; and the resultant hydrolyzed EVA polymer evidenced a residual vinyl acetate level of 13.5% by weight.

In a further run, 57 grams of 15% ethanolic KOH solution was employed; and residual vinyl acetate level was determined to be 4.0% by weight in the resulting ethylene-vinyl acetate-vinyl alcohol terpolymer.

What is claimed is:

1. Substantially aggregate-free alcohol-wet interpolymer particles produced by the process which comprises adding to an aqueous dispersion of finely divided particles of non-hydrolyzed ethylene-vinyl ester interpolymer containing at least about 30% by weight of copolymerized vinyl ester in admixture with a surface active dispersing agent, an anti-coalescing amount of a lower saturated aliphatic monohydroxyl alcohol accompanied by, or followed with, agitation prior to recovering the ethylene-vinyl ester interpolymer particles from the media and thereafter recovering the interpolymer particles from the media in the alcohol-wet condition.

2. A dry-blendable free-flowing powder comprising particles of less than 500 microns of alcohol-wet ethylene-vinyl ester copolymer, said copolymer comprising at least about 30% by weight of combined vinyl ester units, and said alcohol being a lower saturated aliphatic monohydroxyl alcohol.

3. A blend of free-flowing powder comprising particles of less than 500 microns of alcohol-wet ethylene-vinyl ester copolymer, said copolymer comprising at least about 30% by weight of combined vinyl ester units, and said alcohol being a lower saturated aliphatic monohydroxyl alcohol, with particulate polyvinyl chloride.

4. Alcohol-wet partially hydrolyzed ethylene-vinyl acetate copolymer powder containing particulate polyvinyl chloride.

* * * * *